Sept. 29, 1953 — R. T. CELLA — 2,653,642
TRACTION DEVICE FOR VEHICLES
Filed Oct. 14, 1952 — 2 Sheets-Sheet 1
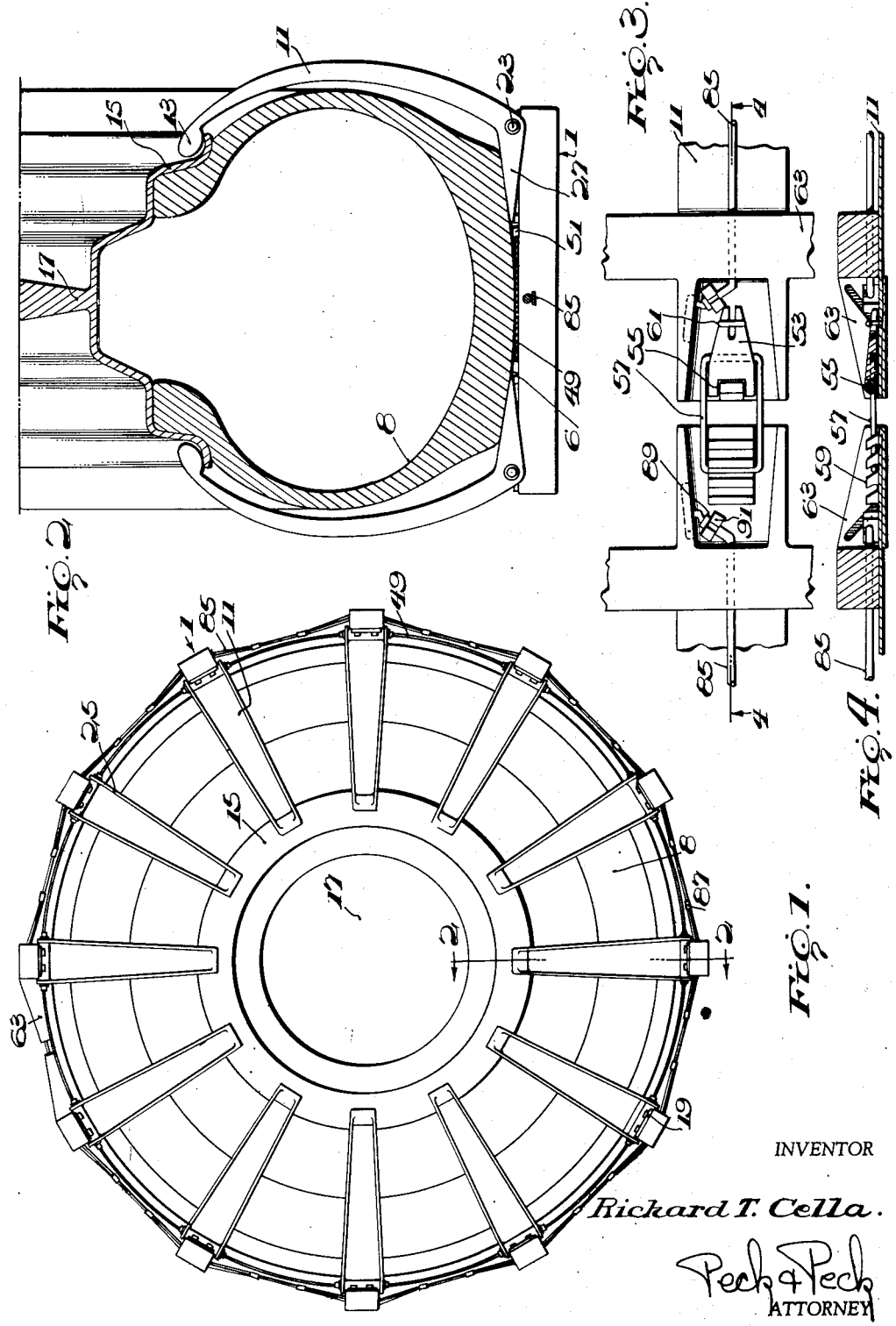
INVENTOR
Richard T. Cella
Peck & Peck
ATTORNEY

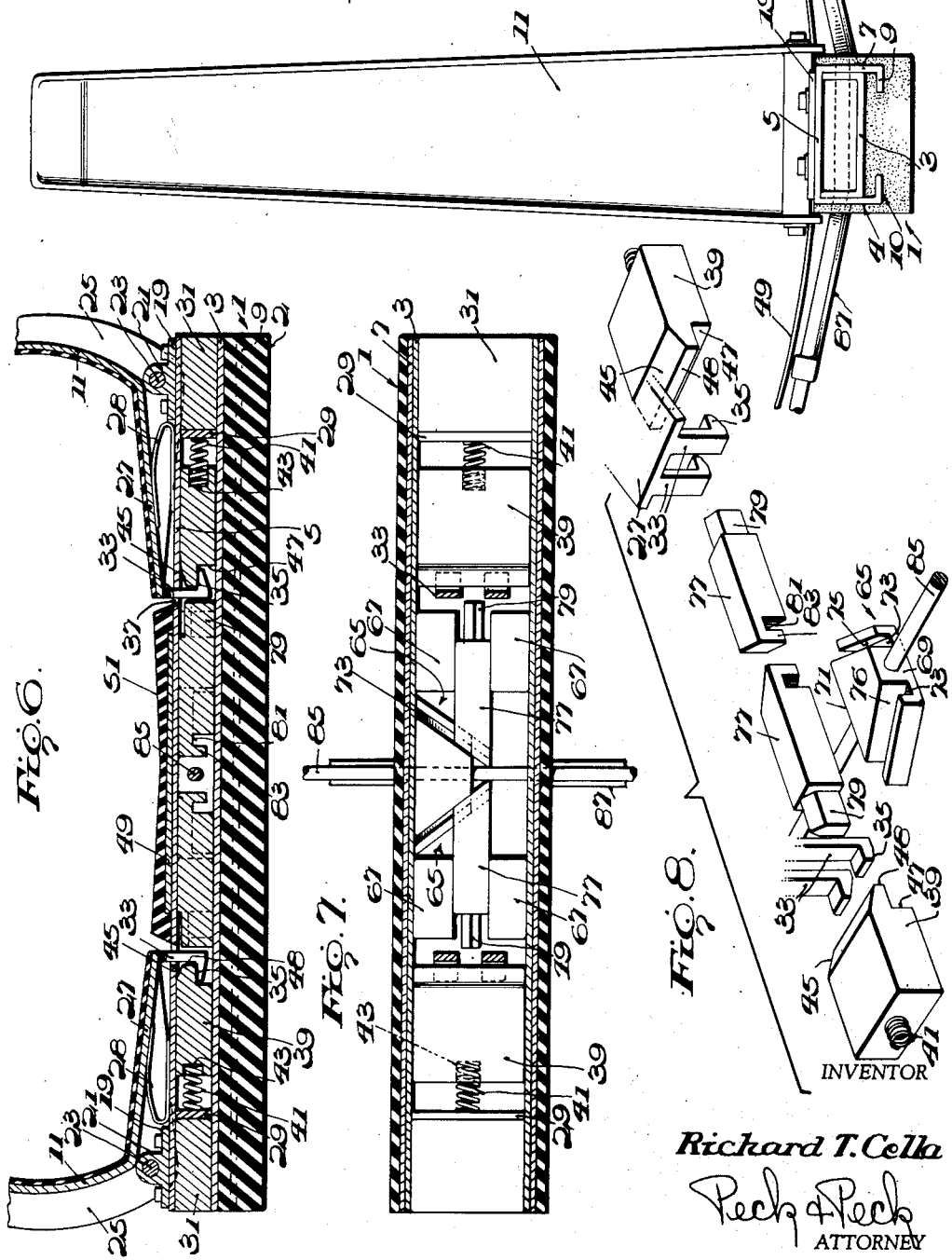

Patented Sept. 29, 1953

2,653,642

UNITED STATES PATENT OFFICE 2,653,642

TRACTION DEVICE FOR VEHICLES

Richard T. Cella, West Windsor, N. J.

Application October 14, 1952, Serial No. 314,596

9 Claims. (Cl. 152—213)

This invention relates broadly to the art of anti-skid devices for vehicles and in its more specific aspects it relates to a traction device which is automatically attachable to the wheels of a vehicle, particularly an automotive vehicle; and the nature and objects of the invention will be readily recognized and understood by those skilled in the arts to which it relates in the light of the following explanation and detailed description of the accompanying drawings illustrating what I at present believe to be the preferred embodiments or mechanical expressions of my invention from among various other forms, arrangements, combinations and constructions, of which the invention is capable within the spirit and scope thereof.

Conventional anti-skid devices which are now known and in use on automotive vehicles consist generally of the chain type wherein a series of spaced chain links extend across the working surface of a vehicle tire from chains on each side, or such devices may consist of separate links of flexible material secured to the wheel area extending across the tire surface to provide non-skid elements. The deficiency in such present anti-skid devices is not in their anti-skid characteristics but in the great difficulty in their application or attachment to and detachment from operative position on a vehicle wheel.

Anti-skid devices are customarily used in snow and mud and the types of such devices which are now on the market must be attached to and detached from the vehicle wheel by manual manipulations at and around the wheel and often at parts of the wheel and tire which are up under the vehicle fender and thus extremely difficult to gain access to. It is a difficult task to apply present day chains in the open in cold, snow and mud, and it is practically impossible to do so without soiling clothes.

I have devised a traction device for vehicles which overcomes the inherent deficiencies in prior art devices, for my device not only provides the necessary anti-skid characteristics but it also provides a device which automatically attaches itself in operative position on the tire of the vehicle wheel and may be detached from the wheel by one simple manual operation.

My device comprises a unitary structure which is laid on the roadway in position to be run over by the vehicle wheel. This is all that must be done, for when the wheel runs over the device it is picked up thereby and automatically locks on the wheel in operative anti-skid relation thereto. Thus, the anti-skid device of this invention may be attached to a wheel in a very simple and easy manner without the difficult manipulations required for the application of prior art devices.

The device which I have devised is economical to manufacture and compact for easy storage in the vehicle when not in use.

This application is a continuation in part of my co-pending application for Automotive Non-Skidding Device, filed February 17, 1951, Serial No. 211,559, and now abandoned.

With the foregoing general objects, features and results in view, as well as certain others which will be apparent from the following explanation, the invention consists in certain novel features in design, construction, mounting and combination of elements, as will be more fully and particularly referred to and specified hereinafter.

Referring to the accompanying drawings:

Fig. 1 is a view in side elevation of my traction device in operative position on a vehicle wheel.

Fig. 2 is a sectional view taken on line 2—2 of Fig. 1.

Fig. 3 is a plan view of the mechanism employed to connect the two ends of the device when it is in operative position on a vehicle wheel.

Fig. 4 is a view taken on line 4—4 of Fig. 3.

Fig. 5 is an end view of one of the cleats and one of the tongs carried thereby.

Fig. 6 is a view in section through one of the cleats, and illustrates the mechanism carried thereby.

Fig. 7 is a view in horizontal section through one of the cleats.

Fig. 8 is an exploded view of the mechanism for releasing the tongs from rim gripping position.

Referring to the accompanying drawings wherein I have used the numeral 1 to designate in its entirety an elastomer cleat of substantial thickness to house and operatively mount certain elements of my device and to provide a non-skid face or tread for contact with the ground or roadway upon which the vehicle is being operated. The ground or roadway engaging surface 2 of each cleat may be formed with any conventional non-skid roadway gripping tread. The anti-skid device of this invention consists of a plurality of cleats 1 operatively associated and combined into an assembly in a manner to be hereinafter described, and since each cleat is of the same construction only one will be described in detail.

The cleat 1 is of sufficient length to receive on the upper surface thereof the tread portion 6 of a vehicle tire 8 which is supported by the cleat when it is in operative road contacting position. The cleat consists of a body of elastic material, which may be rubber, a rubber and fabric combination, or the like. Molded or embedded within a cleat is a metallic member 3 of channel cross section which is received within a further metallic member 10 of generally channel cross section having an upper web 5 connecting sides 7 which may be provided on their free ends with inwardly directed feet or flanges 9. The members 3 and 10 extend substantially from end to end of the cleat but are of reduced width relative thereto and provide strengthening means for the cleat as well as providing mounting means for certain of the operating elements of my automatic attaching and detaching mechanism which I am about to describe. It will also be noted that the member 10 is so molded in the cleat that the web 5 forms the top surface of the cleat body.

Operatively mounted at each end of the cleat for swinging movement relative thereto is a tong 11 which extends upwardly from the cleat, each tong being formed on its upper end with an inwardly directed rim gripping knob 13 which, as will be explained, grips and locks itself to the rim 15 of the vehicle wheel 17 when the device is operatively associated with a vehicle wheel. At each end of a cleat I provide a horizontally disposed plate 19 which may be bolted or otherwise fixed to the web 5 of channel member 10 to thereby provide a supporting base for a journal bearing 21 in which is journaled a pin 23 which extends through flanges 25 which project from the tong whereby a tong is rockably mounted at each end of the cleat. The tongs are provided with a bearing arm 27 extending inwardly from the lower end thereof a distance over the cleat. I mount a leaf spring 28 on web 5 which bears against the under surface of bearing arm 27 to constantly urge the bearing arm upwardly and to thereby rock the tong 11 outwardly into inoperative position. The strength coefficient of this spring is insufficient to separate the assembly from the tire surface, but will function when the tire is rolled away from a cleat.

Inwardly spaced a distance from each end of a cleat I fix a plate 29 in channel member 3 forming a wall extending transversely thereacross, the member 3 from each plate outwardly being filled with the material of which the cleat is formed, as at 31.

Each bearing arm 27 is provided at its inner end with a pair of downwardly depending transversely spaced fingers 33 having on the lower ends thereof outwardly projecting locking teeth 35. Since the bearing arm 27 is rigidly fixed to the tong 11, the tong will rock with the arm carrying the fingers and teeth with it, the fingers extending through a slot 37 formed in web 5 of channel member 7. In the area within channel member 3 inwardly of plate 29 at each end of the cleat I operatively mount a locking block 39 which is mounted for sliding movement longitudinally of the cleat and is constantly urged inwardly under the action of a coiled compression spring 41 which is positioned between plate 29 and the outer end of the locking block which is preferably recessed as at 43 to provide a seat for the spring. At its inner or operating end the locking block 39 at the upper edge thereof is formed with a cam surface 45 and at its inner lower surface is cut way to provide a recess 47 forming a working nose 48 on the sliding block. It will of course be understood that a locking block is slidably mounted adjacent each end of each cleat so that each cleat includes two of such blocks, one to coact with each bearing arm.

An anti-skid assembly as embodied in this invention includes a plurality of cleats 1, each of which is spacedly fixed to a flexible spine or the like preferably metallic member 49. The spine is of a length sufficient to encircle the perimeter of a tire or the like 8 of a vehicle wheel to which the device is removably attached. The spine is fixed to the web 5 of member 10 of each cleat intermediate the ends thereof by welding or in any other suitable manner and may have bonded to those portions of its outer surface which are over a cleat an elastic material 51 to provide a vehicle tire tread supporting surface.

When it is desired to attach the anti-skid assembly to a wheel of a vehicle the assembly is positioned flat on the ground or road in line with the vehicle wheel whereupon the vehicle is driven so that the wheel will run over the device. As the wheel runs over a cleat it engages and downwardly rocks the opposed bearing arms 27 which movement rocks each tong inwardly to swing the gripping knobs 13 into gripping engagement with the rim 15 of the vhicle wheel. When a bearing arm is downwardly rocked by the tire of the wheel as described, the fingers 33 and teeth 35 will move downwardly and the latter will contact cam surface 45 of locking block 39 forcing the block to slide outwardly against the tension of spring 41 until the teeth pass below the working nose of the block whereupon the block will slide inwardly under the action of the spring and the teeth will extend into recess 47 and be maintained therein against upward movement to thereby retain bearing arm in depressed position and consequently maintain the tong in inwardly rocked position with knob 13 locked or gripped to the rim of the wheel. Thus as the vehicle wheel moves progressively over each cleat, the tongs of each cleat will be locked against the rim and the whole device will be locked to the wheel in operative position encircling the tire thereof. It will be evident that I have provided an automatic arrangement for attaching an anti-skid device to a vehicle wheel which is of great simplicity and which eliminates the difficulties heretofore encountered in attaching anti-skid devices to vehicle wheels.

When the assembly is operatively associated with and locked on a vehicle wheel as described, the spine ends or terminals are clamped together by means of a terminal fastener which may consist of a clamping arrangement including a lever body 53 hinged at 55 and controlling a locking loop 57 adapted to be adjustably inserted in any one of a plurality of teeth 59. It will be understood that the teeth 59 are fastened to one end of the spine and the clamping lever and lock loop organization is mounted on and fixed to the spine at the other end thereof. I may provide a lock pin 61 for locking lever body 53 in its clamping position.

In order to protect the spine terminal connecting means from damaging impact against the road over which the vehicle is being driven, I may provide elastomer extensions 63 which extend from the cleats adjacent the terminal connecting means on each side of said connecting means.

I have devised a simple and efficient means for releasing the anti-skid assembly from its operative position locked on a vehicle wheel. This releasing mechanism has been designed to release the assembly following a single manual manipulation which eliminates the usual reaching under fenders and about wheels in order to release or detach an anti-skid assembly from a vehicle wheel.

At a point midway between the ends of each cleat I position a wedge block generally indicated by the numeral 65 which is supported on and within channel member 3 for transverse sliding movement therein. I also fix in any suitable manner within member 3 a pair of transversely spaced guide blocks 67 on each side of the wedge block, the pairs of blocks being longitudinally spaced apart a sufficient distance to provide a channel or groove in which the wedge block is adapted to slide transversely of the cleat. The block is formed with a forward edge 69 of reduced width relative to a rear edge 71 and is provided with a groove 73 adjacent each side which extends parallel to the side edges and provides outer cam surfaces 75 and inner cam surfaces 76. I provide a pair of push rods 77 each of which is formed with a reduced dimension operating end 79 on the outer end thereof and on the inner end is formed with a cross slot 81 forming a lip 83, the inner end of each push rod being cut at an angle conforming to the angle at which the sides of the wedge block extend.

When assembled the release mechanism is mounted within the cleat in position in member 3 for transverse reciprocation therein between the longitudinally spaced pairs of guide blocks 67 and the sides of channel member 3. The push rods 77 are associated with the wedge block with the lip 83 of one rod extended into one groove 73 of the wedge block and the lip of the other rod extended into the other groove so that a push rod extends laterally from each side of the wedge block in a longitudinal direction with respect to the cleat.

Each push rod slidably extends between a pair of guide blocks 67 being restrained thereby from transverse movement relative to the cleat, and the operating end 79 of each push rod is aligned for projection between the spaced fingers 33 of bearing arm 27.

In order to actuate the releasing mechanism a wedge block actuating means such as a flexible cable 85 extends through or is otherwise fixed to each wedge block in any assembly, it being understood that each cleat in the anti-skid assembly includes and mounts a releasing mechanism, including a wedge block and push rods. It will be clear from the drawings that the controlling cable 85 extends through and is fixed to each wedge block and extends through channel members 3 and 10 and the cleat, and the lengths thereof which extend between cleats are beneath the spine. I may provide support arms 87 which are mounted on the cleat and extend from each side thereof and slidably receive and support the cable. At the ends of the cable adjacent the ends of the spine, travel stops 89 may be affixed to the cable and the cable may be locked in either tong locking or releasing position by engaging the stops with the cable stock 91.

Referring particularly to Figs. 6 and 7 of the drawings wherein the bearing arms 27 are disclosed in depressed position with the teeth 35 locked by locking block 39 to thereby maintain the tongs in inwardly rocked position locking the anti-skid assembly to a vehicle wheel, in order to release the teeth from the locking block so that the tongs may rock outwardly for detachment of the assembly from the wheel, the cable 85 is grasped at any point and pulled whereupon each wedge block in each cleat will slide with the forward edge, the leading edge and this action will cause projection of the push rods 77 and the operating ends 79 will be projected between fingers 33 into engagement retracting sliding blocks 39 against the action of springs 41. When the sliding locking blocks are retracted the working noses 43 thereof free teeth 35 so that the bearing arms may swing upwardly and the tongs outwardly for release of the entire assembly from the vehicle wheel.

When it is desired to place the anti-skid assembly in position for application to a vehicle wheel the cable is pulled in the opposite direction to move the wedge blocks rearwardly to thereby retract the push rods out of engagement with the sliding blocks which will move inwardly under the action of springs 41 into position for engaging with teeth 35 when the vehicle wheel depresses the bearing arms, and maintaining the bearing arms in depressed position and the tongs in inwardly swung rim gripping position.

It is within the spirit and scope of my invention to vary the shape of the cleats illustrated in the drawings whereby the impact of the cleats on the roadway may be eased, and it is also to be understood that the elements of my anti-skid assembly may be formed of various materials which may be found suitable.

I claim:

1. A traction assembly for vehicle wheels, including in combination, a plurality of traction cleats connected together in spaced relation, a tong pivotally connected to each end of each cleat and in operative position adapted to clamp against the rim of the vehicle wheel to maintain the assembly in operative position on the wheel, mechanism for releasably locking said tongs in operative rim clamping position, means at each cleat for releasing said mechanism for swinging of said tongs to inoperative position and a cable fixedly attached to each means for operation of the means to release said tongs for swinging to inoperative position upon pulling the cable.

2. A traction assembly for vehicle wheels, including in combination, a plurality of traction cleats, a spine, said cleats fixed to said spine at spaced points therealong, a tong pivotally connected to each end of each cleat and in operative position adapted to clamp against the rim of the vehicle wheel to maintain the assembly in operative position on the wheel, mechanism for releasably locking said tongs in operative rim clamping position, means at each cleat operative to release said mechanism for swinging of said tongs to inoperative position, and control means extending the length of said assembly beneath said spine and fixed to each of said first named means and actuable to cause operation of said first named means to release said tongs for swinging to inoperative position.

3. A traction assembly for vehicle wheels, including a plurality of traction cleats connected together in spaced relation and adapted to have a vehicle wheel run thereover, a tong pivotally connected to each end of each cleat and in operative position adapted to clamp against the rim of the vehicle wheel to maintain the assembly in operative position on the wheel, each tong having a bearing arm extending therefrom inwardly of the cleat in position engaged and depressed by the vehicle wheel when it runs over the assembly, mechanism movably mounted on each cleat and co-active with each bearing arm to lock the bearing arm in depressed position to thereby maintain each tong in operative position.

4. A traction assembly in accordance with claim 3, wherein means are provided on each cleat for releasing said mechanism for swinging of said tongs to inoperative position.

5. A traction assembly in accordance with claim 3, wherein means are provided on each cleat for releasing said mechanism for swinging of said tongs to inoperative position, and control means operatively connecting each of said first named means for the simultaneous operation thereof.

6. A traction assembly for vehicle wheels, including a plurality of traction cleats connected together in spaced relation and adapted to have a vehicle wheel run thereover, a tong pivotally connected to each end of each cleat and in operative position adapted to clamp against the rim of the vehicle wheel to maintain the assembly in operative position on the wheel, each tong having a bearing arm extending therefrom inwardly of the cleat in position engaged and depressed by the vehicle wheel when it runs over the assembly, and each bearing arm including locking elements, and mechanism movably mounted on each cleat and normally in projected position engaging said locking elements when the bearing arm is depressed to maintain said bearing arm in depressed position, and means for retracting said mechanism to release said locking elements.

7. A traction assembly for vehicle wheels in accordance with claim 6, wherein said means for retracting said mechanism includes a bar projectable into engagement with said mechanism to retract the same and a slidable member associated with the bar for actuating said bar.

8. A traction assembly for vehicle wheels, including a plurality of elongated traction cleats connected together in spaced relation and adapted to have a vehicle wheel run thereover, a tong pivotally connected to each end of each cleat for rocking movement on an axis transverse of the cleat, said tongs in operative position adapted to clamp against the rim of the vehicle wheel to maintain the assembly in operative position on the wheel, each tong having a bearing arm fixed thereto and extending therefrom inwardly of the cleat in position engaged and depressed by the vehicle wheel when it runs over the assembly, and each bearing arm including locking elements and mechanism mounted on each cleat and movable longitudinally with respect thereto and normally in projected position engaging said locking elements when the bearing arm is depressed to maintain said bearing arm in depressed position, means on each cleat and movable longitudinally with respect thereto for engaging and retracting said mechanism from its normally projected position, and further means on each cleat movable transversely thereof for engaging and actuating said first named means into position engaging and retracting said mechanism.

9. A traction assembly for vehicle wheels, including a plurality of traction cleats connected together in spaced relation, a tong pivotally connected to each end of each cleat and in operative position adapted to clamp against the rim of the vehicle wheel to maintain the assembly in operative position on the wheel, mechanism for releasably locking said tongs in operative rim clamping position, means at each cleat for actuation to release said mechanism and a camming member slidably mounted on each cleat and operatively connected to said means for sliding movement relative to the cleat to actuate said means to release said mechanism.

RICHARD T. CELLA.

References Cited in the file of this patent

UNITED STATES PATENTS

| Number | Name | Date |
|---|---|---|
| 1,109,699 | Norbury | Sept. 8, 1914 |
| 2,464,564 | Dunner | Mar. 15, 1949 |
| 2,467,654 | Boje | Apr. 19, 1949 |
| 2,520,260 | Robblee | Aug. 29, 1950 |